United States Patent
Szalankiewicz et al.

(10) Patent No.: US 8,028,814 B1
(45) Date of Patent: Oct. 4, 2011

(54) CONVEYOR APPARATUS AND METHOD

(76) Inventors: James J. Szalankiewicz, Armstrong Township, PA (US); Scott A. Walter, Rayburn Township, PA (US); Alan R. Polka, Salem Township, PA (US)

( * ) Notice: Subject to any disclaimer, the term of this patent is extended or adjusted under 35 U.S.C. 154(b) by 448 days.

(21) Appl. No.: 12/004,259

(22) Filed: Dec. 20, 2007

Related U.S. Application Data

(60) Provisional application No. 60/898,655, filed on Jan. 31, 2007.

(51) Int. Cl.
*B65G 21/14* (2006.01)

(52) U.S. Cl. ........ 198/303; 198/824; 198/840; 198/841; 198/861.1

(58) Field of Classification Search ................. None
See application file for complete search history.

(56) References Cited

U.S. PATENT DOCUMENTS

| | | | | |
|---|---|---|---|---|
| 4,986,412 A | * | 1/1991 | Brais | 198/592 |
| 5,353,920 A | | 10/1994 | Szalankiewicz et al. | 198/823 |
| 5,590,757 A | | 1/1997 | Walter et al. | 198/812 |
| 5,645,158 A | | 7/1997 | Polka et al. | 198/812 |
| 6,237,753 B1 | | 5/2001 | Walter et al. | 198/824 |
| 6,360,876 B1 | * | 3/2002 | Nohl et al. | 198/588 |

OTHER PUBLICATIONS

"New Jeffrey 5336RM Low Rigid Belt Structure," Dresser brochure, 2 pp., Apr. 1991.
Miller Belt Structure, 4 photographs A-B-C-D, 1 pp., Aug. 29, 2007.

* cited by examiner

*Primary Examiner* — Kavel Singh
(74) *Attorney, Agent, or Firm* — Douglas G. Glantz

(57) ABSTRACT

Conveyor apparatus and method are disclosed for continuous haulage of coal or ore in an underground mine, including a plurality of floor-supported frame members held in position by belt tension and further held in position optionally by bolts or pins. The novel holding frame provides rapid and efficient extendable, retractable construction in the mine. The novel continuous haulage system handles larger and heavier pieces of equipment and can be pulled to a different position in an underground mine as a complete unit.

20 Claims, 7 Drawing Sheets

CONVEYOR APPARATUS AND METHOD

This application is a Continuation-In-Part of U.S. Patent Application Ser. No. 60/898,655, filed Jan. 31, 2007, which is hereby incorporated by reference.

BACKGROUND OF THE INVENTION

1. Technical Field

This invention relates to conveyor apparatus and method for use in mining operations. In one aspect, this invention relates to conveyor apparatus and a method of mining coal using the conveyor apparatus. In one aspect, this invention relates to a method of making and manufacturing a conveyor apparatus for use in coal mining operations. In one aspect, this invention relates to mining conveyor apparatus and method for performing continuous haulage in a mine.

2. Background

Mining operations today use conveyor apparatus extensively to remove material, e.g., such as coal or ore, from the mine. The conveyor apparatus improves productivity over those methods which do not have "continuous" means for removing mined material from the mine face.

Continuous miner machines work at removing the mined material, e.g., ore or coal, from the mine face and thereby extend into the mine and away from the conveyor or other means for removing the material produced by the continuous miner. After the continuous miner extends so far, the miner must be retracted away from the mine face to install or construct roof supports. Accordingly, the mined material removal means, e.g., the conveyor apparatus, must be capable of extension and retraction in conjunction with movement of the continuous miner.

INTRODUCTION TO THE INVENTION

In the mining of coal today, mining companies are finding the need to provide for the removal of larger and larger volumes and weights of mined material by continuous haulage conveyance out of the mine. Conveyor apparatus and method are needed to receive and convey heavier loads, and to operate in a mine environment which typically subjects the conveyor apparatus to harsh and hostile chemical attack by small particles together with damaging physical forces placed on the conveyor structure by the larger volumes and weights of coal to be conveyed.

Conveyor apparatus available commercially today can be viewed as limited with respect to its flexibility and ease of operation in providing the extension and retractability for following the continuous miner for conveying large amounts of mined material for continuous haulage conveyance out of the mine. New apparatus and method are needed to provide removal of large amounts of mined material for continuous haulage conveyance out of the mine.

In the mining of coal, particularly but not limited to coal strip mines, many coal seams are exposed and/or identified which have a low vertical seam height. By low vertical seam height is meant less than standing room. The low coal seam or low vertical seam height makes it extremely difficult to next to impossible to recover the coal by conventional deep mining equipment and techniques. The low coal is left behind when the cover over the seam is too high to mine the coal by strip mining techniques. Moreover, since the vertical height of these coal seams is so low, it is extremely difficult, if not impossible, to mine the low coal with people in the shaft.

One technique which has developed to mine low coal is with the use of continuous mining equipment. A continuous miner works at the face of the low seam vertical height coal and separates the coal from the face of the mine. The coal produced from the continuous miner is passed preferably to a "continuous haulage" system for removal from the mine face, typically by passing through an extensible conveyor to a mainline conveyor for removal from the mine. By continuous haulage is meant the continuous transportation of the material mined from a continuous miner, from other mining machines, or from a production area to a main conveyor belt or belts leading to the surface or to a main terminal area where the mined material is processed.

Coal produced from the mine face in larger vertical height mines also is conveyed today by a continuous haulage system for removal from the mine.

U.S. Pat. No. 5,353,920, issued to James Szalankiewicz et al., (hereinafter "Szalankiewicz") illustrates an extensible conveyor apparatus and method for a continuous haulage system including a continuous conveyor belt for carrying coal or ore discharged from a continuous miner. A top slider supports the coal-carrying or ore-carrying continuous conveyor belt. A slider holding frame holds the top slider, and floor-supported frame members are held in position by belt tension. The slider holding frame is capable of rapid and nimble extendable, retractable construction in the mine. Rails connect and hold adjacent frame members in position by press-fit attachment of the rails to the frame members.

U.S. Pat. No. 5,353,920, issued to James Szalankiewicz et al., is hereby incorporated by reference and contained herein as if set forth in its entirety as to its complete specification and description and figures of the drawings.

U.S. Pat. No. 5,590,757, issued to Scott Walter et al., (hereinafter "Walter '757") shows another extensible conveyor apparatus and method for a continuous haulage system and continuous conveyor belt for carrying coal or ore discharged from a continuous miner. A top roller-slider combination supports the coal-carrying or ore-carrying continuous conveyor belt. Floor-supported frame members form the bottom of a frame holding the top roller-slider and a bottom belt return which can be secured in position by belt tension. The holding frame is capable of rapid and nimble extendable, retractable construction in the mine. Rails connect and hold adjacent frame members in position by press-fit attachment of the rails to the frame members. The top roller-slider supports the mined-material-carrying belt with a combination of rollers and sliders composed of a material which is lightweight, flame-resistant, and formed into a roller slider combination insert which is quickly replaceable in an underground mine.

U.S. Pat. No. 5,590,757, issued to Scott Walter et al., is hereby incorporated by reference and contained herein as if set forth in its entirety with complete specification and description and figures of the drawings.

U.S. Pat. No. 5,645,158, issued to Alan Polka et al., (hereinafter "Polka") illustrates another extensible conveyor apparatus and method for a continuous haulage system and continuous conveyor belt for carrying coal or ore discharged from a continuous miner. A top roller combination supports the coal-carrying or ore-carrying continuous conveyor belt. Floor-supported frame members form the bottom of a frame holding the top roller-slider and a bottom belt return which can be secured in position by belt tension. The holding frame is capable of rapid and nimble extendable, retractable construction in the mine. Rails connect and hold adjacent frame members in position by press-fit attachment of the rails to the frame members. A top roller supports the mined-material-carrying belt through a combination of rollers formed into a roller combination insert which is quickly replaceable in an underground mine.

U.S. Pat. No. 5,645,158, issued to Alan Polka et al., is hereby incorporated by reference and contained herein as if set forth in its entirety with complete specification and description and figures of the drawings.

U.S. Pat. No. 6,237,753, issued to Scott Walter et al., (hereinafter "Walter '753") illustrates another conveyor apparatus and method for a continuous haulage system and continuous conveyor belt for carrying coal or ore. Substantially flexible linkages connect a middle roller and side sliders on a roller-slider support piece supporting the continuous conveyor belt. Three apertures are positioned on the holding frame to adjust and control the tracking angle at which the support piece receives the continuous conveyor belt. In one aspect, the holding frame is provided by floor-supported frame members held in position by belt tension so that the holding frame is capable of rapid and efficient extendable, retractable construction in the mine. The substantially flexible connecting linkages connect the middle roller and the side slider and connect the side slider to a holding frame for holding the roller-slider support piece. Rails connect and hold adjacent frame members in position by press-fit attachment of the rails to the frame members.

U.S. Pat. No. 6,237,753, issued to Scott Walter et al., is hereby incorporated by reference and contained herein as if set forth in its entirety with complete specification and description and figures of the drawings.

In underground mining, and particularly in but not limited to underground mining wherein the vertical work space affords less than standing room, physical tasks are made more difficult by the confined spaces and constraints imposed by the underground mine. Although the apparatus and method of the present invention are not intended to be limited by particular dimensions in a mine, physical movements and activity are made significantly more demanding in low seam mining, e.g., less than 48 inches in vertical height.

When conveyor apparatus is used in continuous haulage today to remove material from the mine, and when the conveyor apparatus is called upon to extend and retract in conjunction with the continuous miner, the conveyor must be repeatedly constructed and later broken down in the confining spaces and constraints within the mine. Conventional conveyor apparatus can be viewed as lacking in the areas of facilitating extension or retraction while accommodating the difficult physical activities found in the confining spaces or constraints in the underground mine. Novel apparatus and method are needed to facilitate rapid and flexible extension and retraction of the conveyor in the underground mine.

Conventional conveyor belts typically use idler rollers and/or roller bearings for carrying the main belt for hauling material on the endless conveyor belt. The idler rollers and/or roller bearings have difficult duty in the hostile environment of the mine. This hostile environment is attributable to water, corrosion, dust, or other hostile agents found in the mine. When the idler rollers or roller bearings need to be replaced, the load bearing surface typically undergoes a grinding operation by the belt as it passes. When the idler roller or roller bearing is ground to a sharp surface, the conveyor must be taken down to replace the belt.

The difficult duty of idler rollers or rollers containing roller bearings is made more acute with low vertical height mining because the rollers must be made of smaller diameter. The smaller diameter rollers must travel faster because of the higher number of revolutions per unit time. Accordingly, novel conveyor apparatus and method are needed to eliminate problems attributable to conventional idler rollers and other rollers using roller bearings.

Slides serve as substitute apparatus for idler rollers. Slides are available commercially, made typically of stainless steel. Stainless steel has a high coefficient of friction, e.g., such as on the order of 0.55-0.7, and the stainless steel wears out because of a high coefficient of friction and the attendant abrasion that goes with the higher coefficient of friction. When the stainless steel slider wears out, or in anticipation of the slider wearing out as part of a preventative maintenance program, the stainless steel slider must be periodically disassembled and taken out of the mine to put in a new stainless slider. The stainless steel slider is taken out of the mine to weld in place the metal slider into the slider frame. The rebuilt stainless steel slider then is taken back into the mine and retrofitted into the conveyor.

In today's mining industry, larger and heavier pieces of equipment are being used in the industry, and we have found there is a need in certain applications to make a heavy rail system for a continuous haulage in these heavier applications.

Although certain existing technology has overcome the weight of the equipment, it has been to the sacrifice of the flexibility and the mobility of the rigid frame modular (RFM) units. Moreover, we have found the need for flexible continuous haulage system structure capable of being advanced together as a unit and further have found the need for flexible continuous haulage system structure capable of withstanding the heavier equipment.

We further have found there is a need in certain applications to make a continuous haulage system which is locked together rigidly, with individual components, and which is capable of being used as a longer conveyor haulage system, yet capable of functioning as a flexible extensible continuous haulage structure.

We further have found there is a need in certain applications to make a continuous haulage system which enables the entire unit to be advanced as a complete conveyor system or as a flexible extensible continuous haulage structure.

A new mining conveyor apparatus and method are needed to provide a continuous haulage structure for heavier equipment systems and to fill the current needs of the mining industry.

It is an object of the present invention to provide novel mining conveyor apparatus and method for a continuous haulage system.

By continuous haulage is meant the uninterrupted transportation of material from a continuous miner unit to the mine transportation system by several units of haulage equipment and an associated continuous and advancing conveyor system.

It is an object of the present invention to provide novel mining conveyor apparatus and method to provide for the removal of large volumes and weights of mined material by continuous haulage conveyance out of the mine by a continuous haulage system.

It is an object of the present invention to provide novel mining conveyor apparatus and method to provide for the removal of large volumes and weights of mined material using larger and heavier equipment for continuous haulage conveyance out of the mine by a continuous haulage system.

It is another object of the present invention to provide an extensible mining conveyor method and apparatus locked together rigidly with individual components.

It is another object of the present invention to provide an extensible mining conveyor apparatus and method capable of being used as a longer conveyor haulage system, yet capable of functioning as a flexible extensible continuous haulage structure.

It is another object of the present invention to provide an extensible mining conveyor apparatus and method capable of enabling the entire unit to be advanced as a complete conveyor system or capable of operating as a flexible extensible continuous haulage structure.

It is another object of the present invention to provide an extensible mining conveyor apparatus and method capable of rapid, efficient, and flexible extendable and retractable construction in a mine.

It is another object of the present invention to provide an extensible conveyor apparatus and method for providing a continuous conveyor belt for carrying coal or ore discharged from a continuous miner.

It is a further object of the present invention to provide an extensible conveyor apparatus having a holding frame capable of rapid, efficient, and flexible construction and disassembly in the confining spaces and constraints of an underground mine.

It is a further object of the present invention to provide an extensible conveyor apparatus which reduces the conveyor drive motor requirements in size and amperage and which permits for longer runs of conveyor between conveyor drive motors.

These and other objects of the present invention will become apparent from the detailed description and the illustrations of the figures of the drawings which follow.

SUMMARY OF THE INVENTION

The present invention provides a rigid framed structure conveyor apparatus and method with the aspect and ability to be disassembled into individual components and moved and also with the aspect and ability to be moved as a complete unit. An extensible conveyor apparatus and method of the present invention for a continuous haulage system include a continuous conveyor belt for carrying coal or ore discharged from a continuous miner, a top slider insert for supporting the coal-carrying or ore-carrying continuous conveyor belt, a bottom belt return, and a holding frame for holding the top slider insert, wherein the holding frame is provided by a plurality of floor-supported frame members held in position by belt tension and/or bolts or pins, the holding frame being capable of rapid and efficient extendable, retractable construction in the mine, and wherein the continuous haulage system also is capable of handling larger and heavier pieces of equipment and also is capable of being pulled to a different position in an underground mine as a complete unit.

The present invention includes rails for connecting and holding adjacent frame members in position by press-fit attachment of the rails to the frame members, but also is capable of being pulled to a different position in an underground mine as a complete unit.

The present invention provides a conveyor system in such a manner that each and every component is capable of being lifted, carried, installed, and disassembled manually, i.e., by hand.

DETAILED DESCRIPTION

Figure 1:
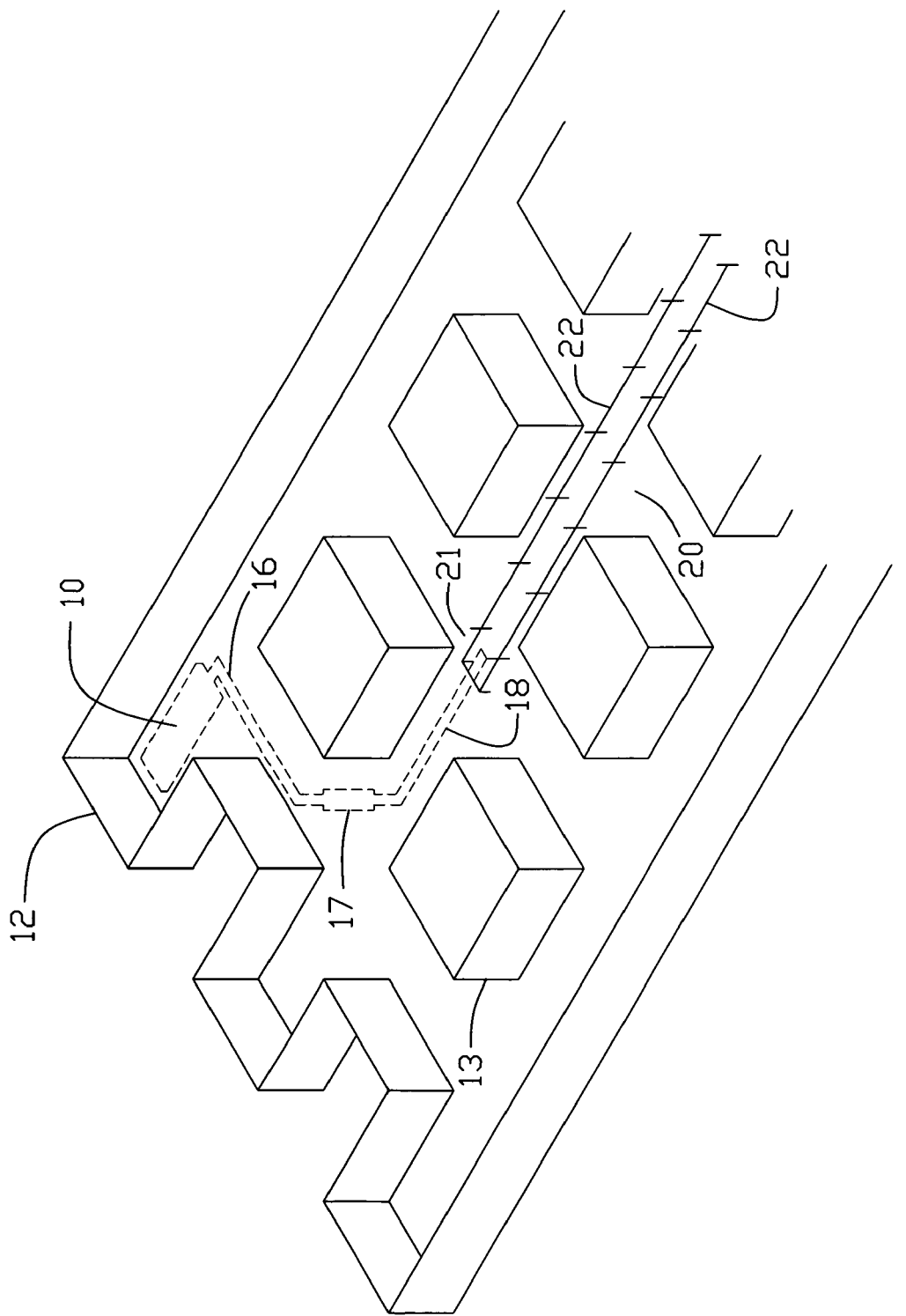
FIG. 1 depicts a continuous mining operation in an underground mine by the room and pillar method and shows a tail piece and inboard or inby portion of a conveyor of the present invention.

The present invention includes novel conveyor structure apparatus and novel method for providing and using the novel conveyor structure in mining with a continuous haulage system. The novel apparatus and method of the conveyor structure of the present invention enable use in a broad arena of mining operations, including using the larger and heavier pieces of equipment needed today in the mining industry. The novel apparatus and method of the conveyor structure of the present invention operate in certain applications to make a heavy rail system for a continuous haulage in heavier applications.

The present invention provides a novel conveyor structure apparatus and a novel method for providing and using the novel conveyor structure further including the aspect and ability to provide a Quick Pull of the structure in the mine by dragging or pulling up the structure to a different position in the mine.

By "Quick-Pull" is meant a term to represent the aspect and ability for providing quick assembly and disassembly of individual components together with the aspect and ability to be pulled forward (advanced) or pulled back (retreated) as a rigid unit, capable of lockable tear down (hereinafter "LTD").

The novel apparatus and method of the conveyor structure of the present invention provide a preferred flexibility and mobility of the structure of the present invention which is not provided or available with rigid frame modular (RFM) units. The novel apparatus and method of the conveyor structure of the present invention also provide a mining operator with a conveyor structure including a flexible continuous haulage system structure capable of being advanced together as a unit and further for flexible continuous haulage system structure capable of withstanding and accommodating the heavier equipment.

The novel apparatus and method of the conveyor structure of the present invention provide a continuous haulage system which is locked together rigidly, with individual components, and which is capable of being used as a longer conveyor haulage system, yet capable of functioning as a flexible extensible continuous haulage structure.

The novel apparatus and method of the conveyor structure of the present invention provide a continuous haulage system which enables the entire unit to be advanced or redirected as a complete conveyor system or as a flexible extensible continuous haulage structure.

The novel apparatus and method of the conveyor structure of the present invention provide novel mining conveyor apparatus and method for a continuous haulage system and the removal of large volumes and weights of mined material by continuous haulage conveyance out of the mine by a continuous haulage system, including the removal of large volumes and weights of mined material using larger and heavier equipment for continuous haulage conveyance out of the mine by the continuous haulage system of the present invention.

The novel apparatus and method of the conveyor structure of the present invention are capable of enabling the entire unit to be advanced or redirected as a complete conveyor system or capable of operating as a flexible extensible continuous haulage structure, including rapid, efficient, and flexible extendable and retractable construction in a mine, and including an extensible conveyor apparatus and method for providing a continuous conveyor belt for carrying coal or ore discharged from a continuous miner.

The present invention provides for the rapid, efficient, and flexible construction and disassembly in the difficult work for mining operations performed in confining spaces and constraints of an underground mine.

The novel apparatus and method of the conveyor structure of the present invention include a trussed reinforced square or tubular rail slides over a round alignment pin with a tongue and groove plate assembly and locking pin.

The novel apparatus and method of the conveyor structure of the present invention include bottom stands to the tubular reinforced rails, in one aspect which are interlocked.

Tubular trussed rail include the aspect and ability to assemble or disassemble individual components and provide the capabilities and characteristics of a rigid frame modular structure and versatility and flexibility of a component tear down system.

It has been found empirically that, unlike prior rigid frame modular units, the apparatus and method of the conveyor structure of the present invention provide the aspect and ability to repair individual parts or components of the rigid frame modular structure.

It has been found that the interlocking of the tubular reinforced rails provides the conveyor system with the capability of withstanding greater loads and further provides the conveyor system with the capability of being advanced as a complete unit.

In the operation of the present invention, bolts are added just prior to pulling the structure up to a different position in the underground mine or a redirected position in the underground mine. In accordance with the present invention, the structure is pulled up, and then the conveyor can be run without the bolts.

It has been found empirically that the present invention works with preferred results when compared to an arch truss rail, which may bend up in the middle, even to the extent that one working in the mine can place a shovel underneath the rail. We have observed and found that the arch truss rail can move the rails and bottom rail out and then bends in failure mode.

In accordance with the present invention, two full plates have been found to be preferred as compared to two separate tabs on the inside of the rail and floor structure. Further in accordance with the present invention, round pins have been found to be preferred because the round pins provide a better fit than square, and because rails come with a seam on the bottom and the round male piece. The seam gets grounded down sometimes. Almost always, or, in other words, about 98% of the time, the seam is on an end. In the cases when it is not on an end, the mine operator must grind it off.

In accordance with the present invention, there are only four points of contact.

In accordance with the present invention, the new structure provides the aspect and ability for the tail piece to get pulled as a continuous unit or independently, as may be required.

Rigid Frame Modular (RFM) mining conveyor structures have, by way of example, an extended unit structure of typically 180 to 280 feet in length, and in that context are very heavy, composed of 9 to 18 foot long sections, and in a truss box with diagonals. Moreover, when starting out or changing directions, the mining operator must put pieces in, and such an operation requires the need to break the conveyor, and further to fish and/or thread the conveyor belt back through and then recouple the full extended structure of typically 180 to 280 feet in the structure when threaded up and pulled up. In accordance with the present invention, however, in the rooms and mains of an underground mine, the mine operator can move the rails and add a new section or piece of structure or pull it up.

Further, by way of example in support of the much preferred operation of the present invention, if a piece breaks in RFM, the mining operator needs to replace the entire 9 to 18 foot Modular Unit.

In accordance with the present invention, however, the mine operator only needs simply to put in a new component, and does not need to redo the whole entire structure.

In accordance with the present invention, wings are provided on the front to glide.

RFM is all welded together. The mining operator uses one singular section, e.g., 9 to 18 feet long section, and cross pieces are welded in.

In accordance with the present invention, the mining operator merely sticks the cross piece through, without the need for welding.

A clearance is cut on the side of a cross piece so a dolly wheel does not catch and cuts the weight off it.

Weight on the rail puts the arch truss in tension and in a middle compression.

The present invention also includes a novel dolly having wheels which can be removed and can slide right off.

In one aspect, in accordance with the present invention, hydraulic lifters are provided in the tail piece.

In one aspect, in accordance with the present invention, only one tail piece is needed for the whole conveyor system. Similarly, in mining operations, only one dolly is needed.

In accordance with the present invention, in the rooms and mains of an underground mine, the mine operator can move the rails and add a new section or piece of structure or pull it up.

The present invention presents the aspect and ability for each and every individual component to be lifted, carried, assembled, and disassembled manually, i.e. disassembled by hand.

Referring now to FIG. 1, continuous miner 10 is shown operating in position at the mine face 12 in a room and pillar method of mining. FIG. 1 depicts the continuous mining operation in an underground mine by the room and pillar method and shows a tail piece 21 and inboard or inby portion of the conveyor of the present invention. Coal is mined at the mine face 12 to form rooms with pillars 13 of coal remaining for support. Continuous miner 10 is operated to remove most of the vertical coal or ore from the seam and to leave just a very thin top and bottom layer of coal or ore behind. In this manner, the mined material is not contaminated with rock or other materials found vertically just adjacent to and outside a coal seam.

Continuous miner 10 removes material from the face 12 and transports and passes the material along bridges 16 and 17 to conveyor apparatus 20. Conveyor apparatus 20 has tail piece 21 and side rail assemblies 22. Coal from the continuous miner is typically passed along bridges 16 and 17 to be discharged onto conveyor apparatus 20. Conveyor apparatus 20 carries the mined material to a main conveyor (not shown) for carrying the mined material out of the mine.

Figure 2:
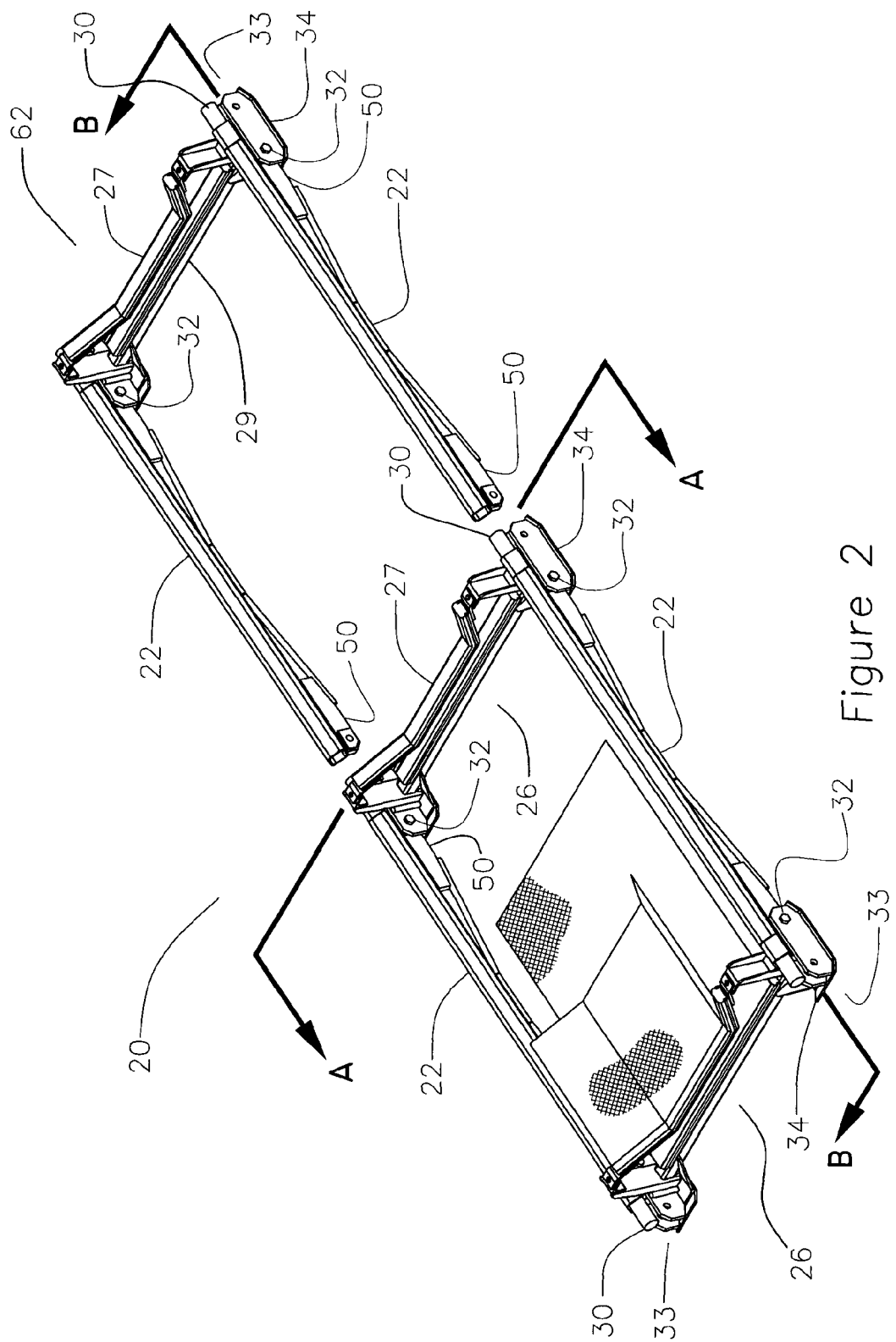
FIG. 2 shows a perspective view of a novel conveyor apparatus and method of the present invention.
Figure 6:
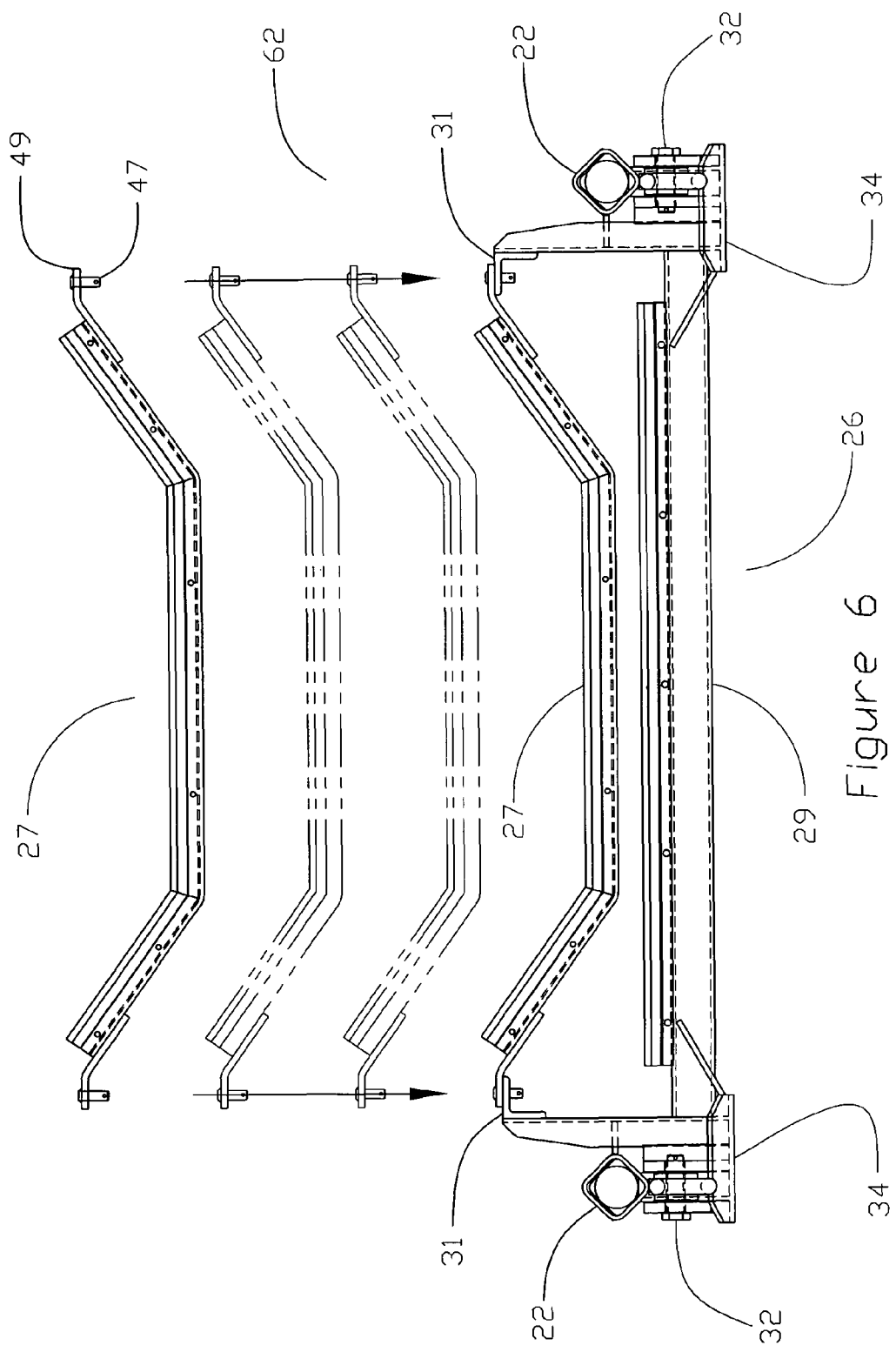
FIG. 6 shows an elevation view of a top slide bottom stand assembly of the present invention.
Figure 7:
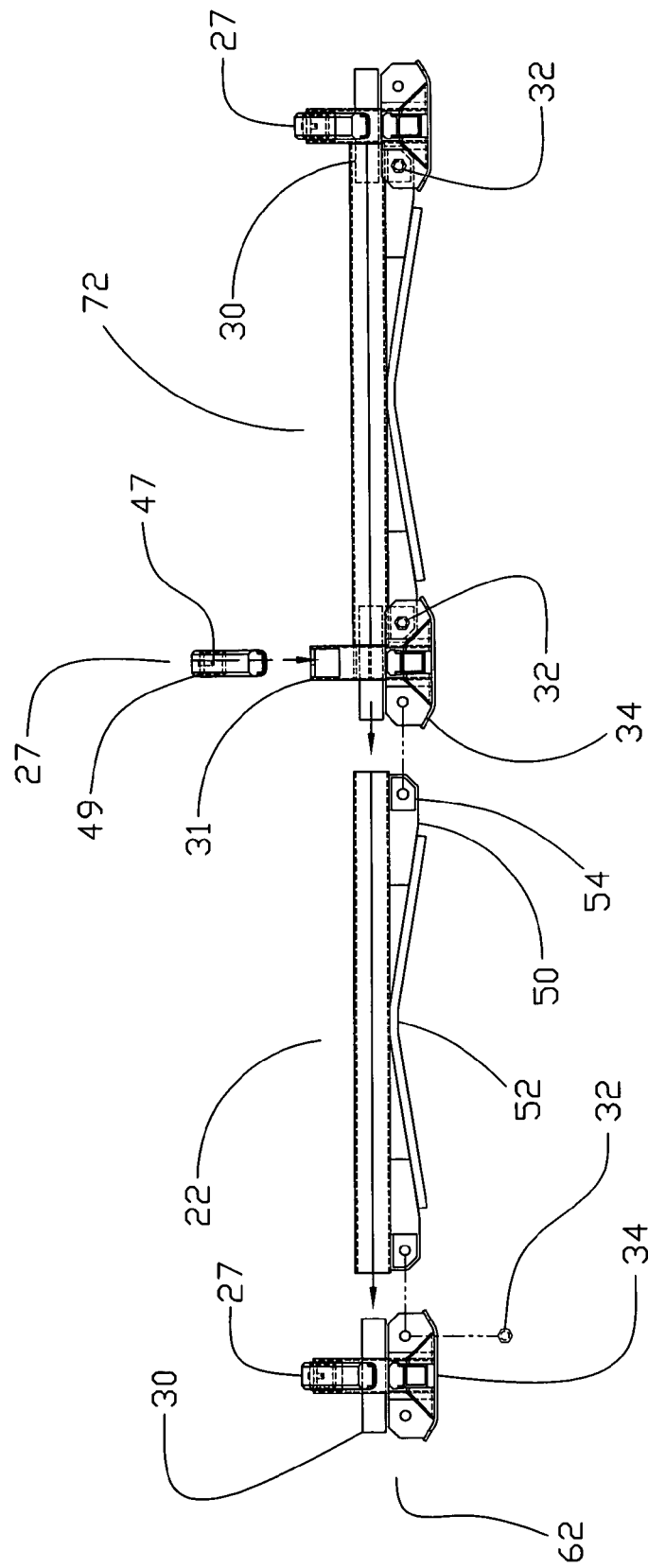
FIG. 7 shows an elevation view of a complete quick pull rail assembly of the present invention.

Referring now to FIG. 2, conveyor apparatus 20 includes two (2) truss reinforced side rail assemblies 22, interconnected and locked with two (2) floor supported bottom stands 26 (FIG. 3) by locking pin 32. A top slider 27 is supported by floor supported bottom stand 26. Cross Section AA is shown in FIG. 6, and Cross Section BB is shown in FIG. 7.

Figure 3:
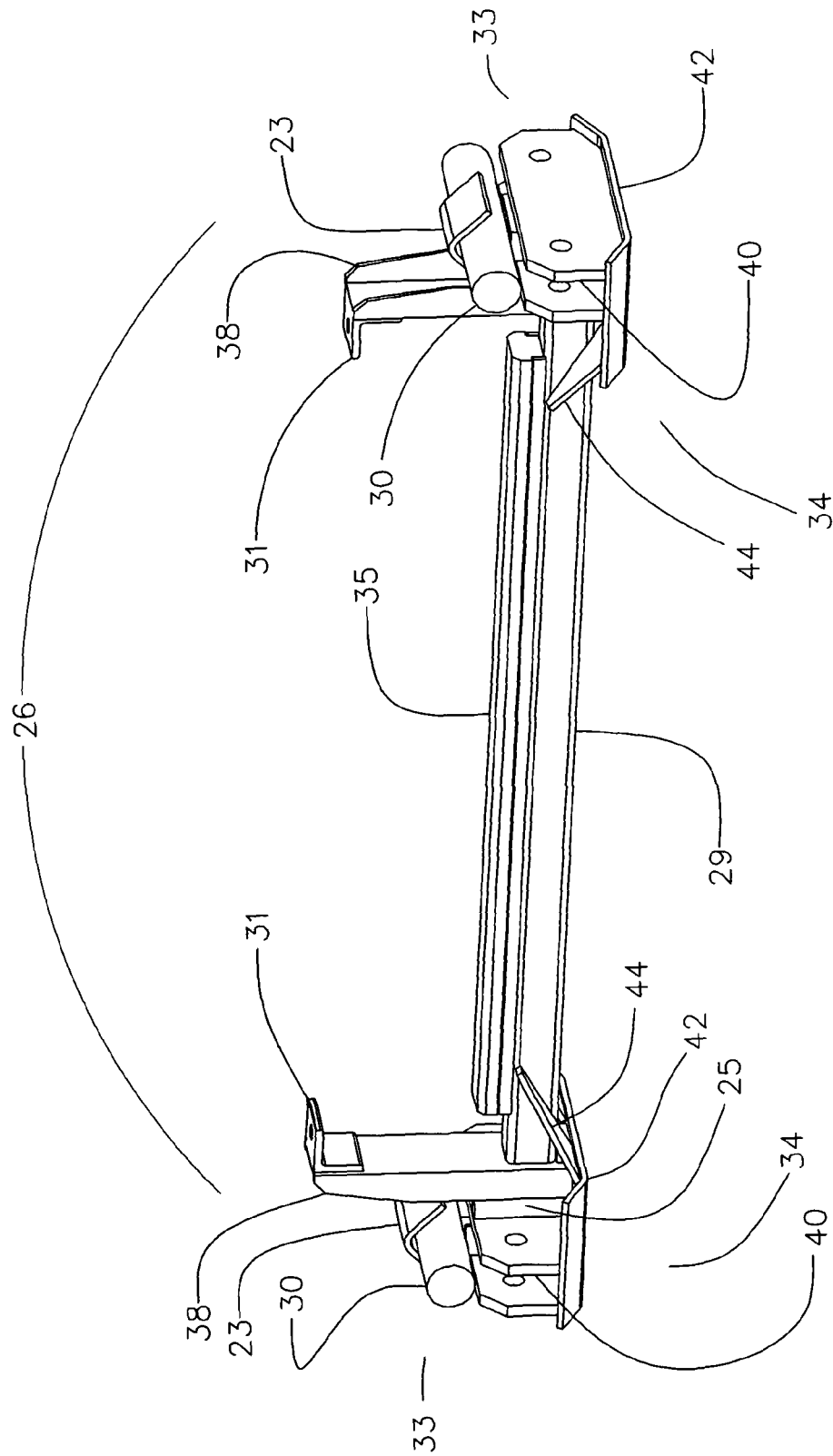
FIG. 3 shows a perspective view of the floor supported bottom stand of the present invention.

Referring now to FIG. 3, a floor supported bottom stand 26 connects and locks truss reinforced side rail assemblies 22 (FIG. 2 and FIG. 5) by the use of two (2) vertical/horizontal alignment pins 30 and includes top slider holding frame 31, a tubular cross member 29 that supports the bottom belt (not shown), a return belt slider 35, two floor support skid plate assemblies 34 and two locking plate assemblies 33 which are constructed from two locking receiver plates 40. Two rail transition shims 23 provide a smooth transition for dolly wheels to travel from rail to rail.

Referring again to FIG. 3, a tubular cross member 29 supports the bottom belt (not shown) and increases the strength and rigidity of the floor supported bottom stand 26. Tapered vertical support 38 increases a dolly wheel clearance in the top slider holding frame 31.

Tapered vertical support 38 is attached to vertical spacer 25 and to locking receiver plate 40 of locking plate assembly 33 which receives the truss reinforced side rail assembly 22 (FIG. 2 and FIG. 5) and strengthens the floor support skid plate assembly 34. Skid plate 42 of the floor support skid plate assembly 34 supports conveyor apparatus 20 (FIG. 2) and is formed to reduce resistance as conveyor apparatus 20 is advanced or retreated by dragging and also strengthens the locking receiver plate 40. Support gusset 44 reinforces the floor supported bottom stand 26 and floor support skid plate assembly 34.

Figure 4:
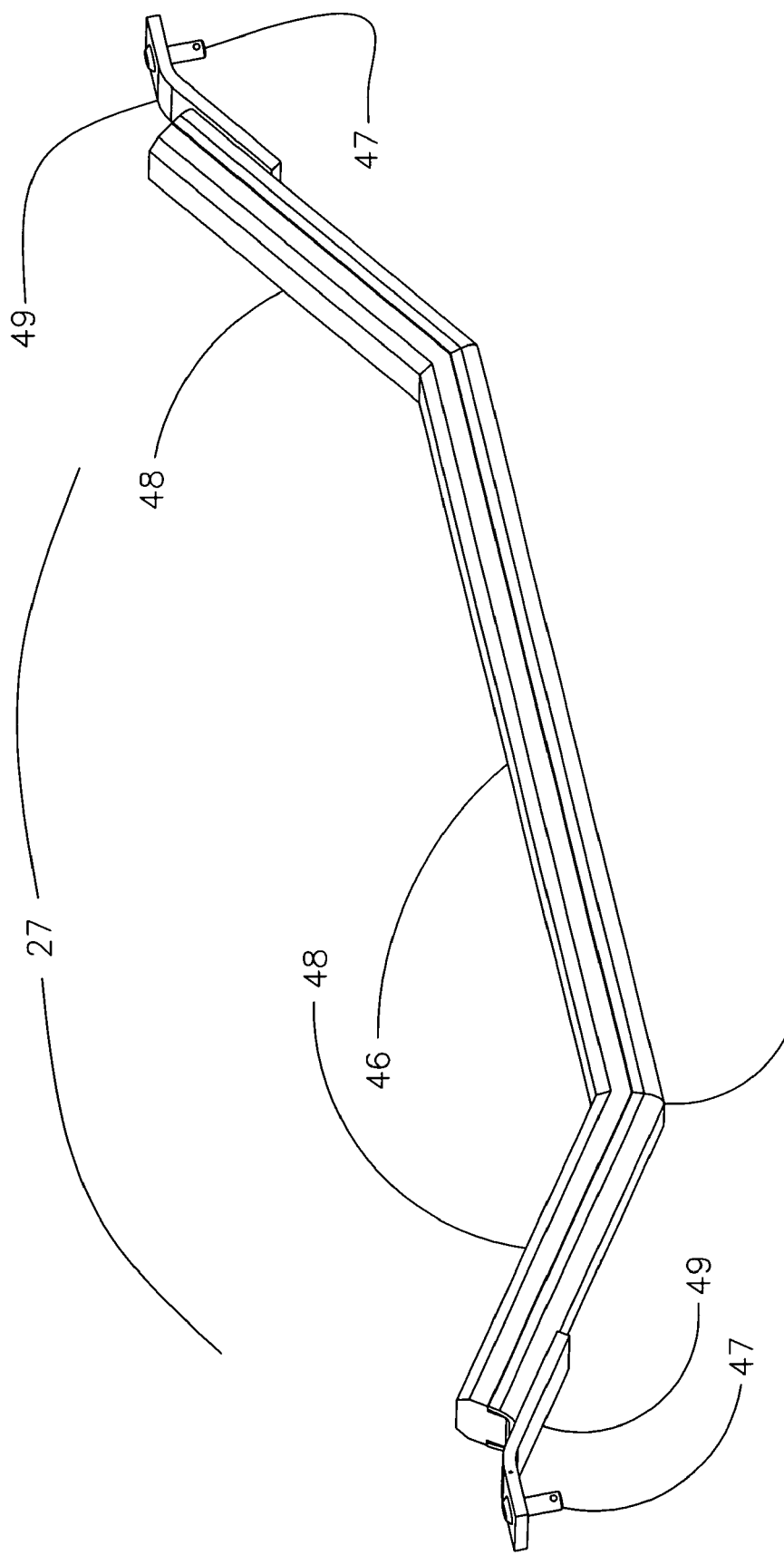
FIG. 4 shows a perspective view of an individual detailed top slider assembly of the present invention.

Referring to FIG. 4, a top slider 27 is shown having a substantially horizontally disposed middle section 46 and upwardly turned end sections 48 to form a troughing or cupping and, preferably, greater than about a 15 degree angle of troughing/cupping and, preferably greater than about 20 degrees. Most preferably, horizontally disposed middle section 46 and upwardly turned end sections 48 form a troughing or cupping angle greater than about 27 degrees. Top slide frame 45 holds top slider sections 46 and 48. Retainer pin 47 and connecting flange 49 attach to top slider frame 45.

Figure 5:
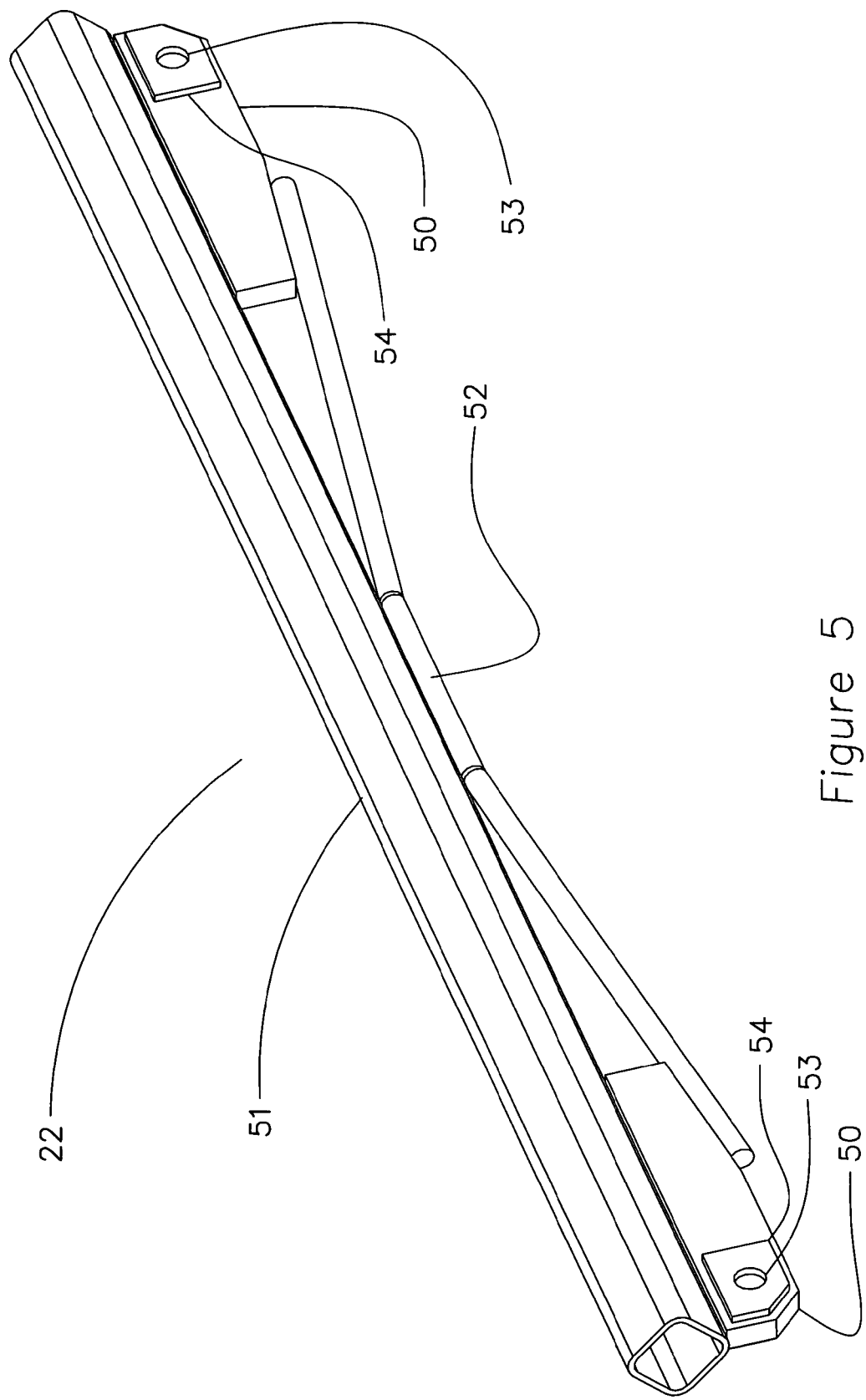
FIG. 5 shows a perspective view of a truss reinforced side rail assembly of the present invention.

Referring to FIG. 5, truss reinforced side rail assembly 22 having connecting plate 50 increases the yield of the rail 51 and forms a solid linkage to the locking plate assembly 33 (FIG. 3). Clearance truss bar 52 is double bent to strengthen the rail 51 and enhances the ability to clean under the truss reinforced side rail assembly 22. Reinforced shim plate 54 reinforces the locking pin hole 53 and connecting plate 50 and vertically stabilizes the truss reinforced side rail assembly 22.

Referring now to FIG. 6, Cross Section AA from FIG. 2, shows top slide bottom stand assembly 62. Top slider 27 and floor supported bottom stand 26 connect by connecting flange 49 and retainer pin 47 through top slider holding frame 31.

Referring now to FIG. 7, Cross Section BB of FIG. 2 shows complete quick pull rail assembly 72, composed of at least two truss reinforced side rail assemblies 22 and two top slide bottom stand assemblies 62, to be extended with the addition of one top slide bottom stand assembly 62 and two truss reinforced side rail assemblies 22 to extend the complete quick pull conveyor system 72, as required. The completed assembly 72 may be pulled as a unit, as may be required, by utilizing locking pin 32 or as a stand alone extensible continuous haulage system without locking pin 32.

The conveyor structure of the present invention is the only break down structure that can be connected as Lockable Tear Down Structure (LTD) extensible belt tension conveyor structure.

Locking plate assembly 33 in combination with the floor support skid plate assembly 34 and the support gusset 44 have been found to enhance and strengthen the rail and increase the pull ability.

Connecting plate 50 and clearance truss bar 52 have been found and proved to increase weight capacity of the rail Skid plate 42—double flange, bent with a slope on each end, enables the conveyor structure of the present invention to be pulled or pushed with limited resistance. Also because both ends are symmetrical, there is no right or wrong direction, it is totally reversible during installation.

The LTD structure is much more open along the Truss Reinforced Side Rail Assembly 22, of FIG. 2, in comparison to the traditional Rigid Frame Structure (RFM), which makes it much less likely for the conveyor to become plugged, in turn restricting the movement of or even stalling the belt.

The arched access under the Clearance Truss Bar 52, FIG. 5, makes it easier to clean combustible material (coal spillage), thereby enhancing safety.

Ultra High Molecular Weight (UHMW) Sliders 27, FIG. 4, and 35, FIG. 3, produce less friction in conjunction with the conveyor belt as compared to the traditional Rigid Frame Structure (RFM). Stainless steel sliders require less energy and, therefore, less energy costs compared to UHMW plastic.

UHMW Top Slider 27, FIG. 4, and Belt Return Slider 35, FIG. 3, because of less friction, wear longer and also do not wear to a sharp edge which can and will damage the conveyor belt as the traditional Rigid Frame Modular Structure (RFM).

The UHMW Top Slider 27, FIG. 4, and Return Belt Slider 35, FIG. 3, are easily replaced in comparison to the traditional Rigid Frame Modular (RFM) which for replacement require cutting with a torch and removing the worn stainless slider and in turn welding new stainless steel slides to the Rigid Frame Rigid Structure (RFM).

The very low profile of the Locking Plate Assembly 33 and Vertical Horizontal Alignment Pin 30, FIG. 3, allow for the Top Slider 27 to have an increased troughing angle, up to forty degrees, thus increasing the conveyor capacity and reducing conveyor spillage and enhancing safety.

The components of the Top Slide Bottom Stand Assembly 62, FIG. 6, and the Complete Quick Pull Rail Assembly 72, FIG. 7, are of a size and weight which enable assembly and disassembly by hand, therefore eliminating the requirement of large mobile equipment in comparison to the individual sections of the traditional Rigid Frame Modular Structure (RFM). The elimination of the large mobile equipment in confined area with limited vertical height enhances safety.

The Quick Pull LTD Structure may be reduced to smaller individual components which may be more easily moved from place to place as compared to the traditional Rigid Frame Modular Structure (RFM). The smaller individual components enhance the aspect and ability to move the structure from place to place as compared to the traditional Rigid Frame Modular Structure (RFM), thereby increasing efficiency, productivity and safety.

The solid connection of the Connecting Plate 50, FIG. 5, and Locking Plate Assembly 33, FIG. 3, and the insertion of Locking Pin 32, FIG. 6, allow for the Quick Pull LTD Structure to be installed in areas of rolling, undulating coal seams without the risk of the structure from pulling apart.

The solid connections of the Locking Plate assembly 33, FIG. 3, Connecting Plate 50, FIG. 5, and Locking Pin 32, FIG. 6, in addition to the strength and mass of the assembled Quick Pull LTD Structure enables the Quick Pull LTD Structure to withstand the increased weight and operational forces of modern highly productive Continuous Haulage Mobile Equipment.

In a typical mining application, the Quick Pull LTD apparatus and method of the present invention is attached to a belt conveyor drive unit and a sufficient quantity of Quick Pull LTD structure is installed to transport the product being conveyed from the continuous haulage system, from the tail piece 21, along the entire length of the conveyor apparatus to be discharged from the conveyor drive unit.

By "Quick-Pull LTD" is meant to represent the aspect and ability for providing quick assembly and disassembly of individual components with the aspect and ability to be pulled forward (advanced) or pulled back (retreated) as a rigid unit, capable of Lockable Tear Down.

The conveyor structure system of the present invention is installed by attaching a floor supported bottom stand 26 at the rear or inby end of the conveyor drive unit, two truss reinforced side rail assemblies 22, one on each side, are then attached by sliding the end of the truss reinforced side rail assembly 22 over the vertical/horizontal alignment pin 30 which process also installs the connecting plate 50 into the locking plate assembly 33. At that time, locking pins 32 are to be installed into the locking plate pin hole in connecting plate 50.

The method then is repeated until the desired and required length of Quick Pull LTD structure has been installed. At that time, the tail piece 21 is installed to terminate and complete the Quick Pull LTD conveyor system. When lengthening of the Quick Pull LTD structure is needed or desired or otherwise may be required, the tail piece 21 is removed, additional Quick Pull LTD structure is installed, and the tail piece 21 replaced. Individual advances or additions of Quick Pull LTD structure are repeated as needed or desired or otherwise required.

At the discretion of the operation personnel, the Quick Pull LTD structure is advanced as described by the addition of the Quick Pull LTD conveyor apparatus 20, or the entire Quick Pull LTD system is dragged forward, and a conventional conveyor system is installed from the Quick Pull LTD system to the conveyor drive unit.

The construction of conveyor apparatus 20, including floor supported bottom stand 26, truss reinforced side rail assemblies 22, and top slider 27, allows for the components to be assembled and disassembled, in confined spaces, without the need for mechanized equipment.

As an additional benefit of the design of the Quick Pull LTD structure in the event of damage to any individual component or group of components, the damaged component or components simply are removed and replaced. The damaged component or components simply are removed and replaced, thus reducing down time and increasing productivity.

As an additional benefit, the Quick Pull LTD structure has increased strength and durability, thus permitting the utilization of modern high production continuous haulage equipment.

A key feature of the Quick Pull LTD structure is the unique aspect and ability to utilize it as a tear down add-on structure or as a drag-forward complete conveyor unit or system The interlocking conveyor structure of the present invention provides a novel conveyor system capable of withstanding greater loads and further capable of being advanced as a complete unit. The interlocking conveyor structure of the present invention enables it to be advanced as the existing conventional rigid frame structure yet with the aspect and ability to be assembled manually.

The advantages characteristics of the Quick Pull LTD structure include small individual components, quickly and easily assembled or disassembled, in limited height, in one aspect, to overcome the shortcomings of traditional rigid frame conveyor structure.

Unlike conventional rigid frame structure which does not provide the aspect and ability to replace components in the event of a failure of that component, Quick Pull LTD structure allows for quick and efficient replacement of individual failed components, thus reducing maintenance costs and down time and improving productivity.

The size, weight, and aspect and ability to package and transport the individual components increase the efficiency of materials handling and placement, thus reducing labor cost, improving productivity, and safety.

The advantage characteristics of the Quick Pull LTD structure provide for the installation to be performed manually without the utilization of mechanized equipment in limited confined areas, eliminating the need to work in the vicinity of and adjacent to mechanized equipment, thus enhancing safety and efficiency.

The advantage characteristics of the Quick Pull LTD structure enable it to withstand the loads and stresses which are developed when utilizing massive modern highly productive continuous haulage systems.

The structure and use of the Quick Pull LTD conveyor system of the present invention provide for ease of maintenance and cleaning of the conveyor system, thus increasing mine safety. The utilization and replacement of the individual components enhance conveyor belt servicing, installation, and replacement.

The novel conveyor apparatus and method of the present invention accordingly have been found to provide preferred advantages over conventional conveyor apparatus and methods and operate to produce significantly more production during a shift in which the conveyor must be extended or retracted or redirected.

The novel mining conveyor apparatus and method provide for heavier equipment and significant efficiency for extendible and retractable construction of the belt stands in the mine to facilitate room advancement. As the continuous miner extends into the face of the coal in an underground mine or is redirected in an underground mine, the novel mining conveyor and method can extend with it. The conveyor length in the extensible continuous haulage system can be 750 feet to 1,000 feet or longer and will be limited only by mining regulations.

In one aspect, the floor-mounted holding frames are positioned to be interconnected with press-fit attachment of side rails to the frame members. No bolts or welding in the confined spaces of the underground mine are needed. The novel mining conveyor and apparatus provide a superior advantage over conventional conveyor apparatus in that bolts are eliminated. Workers who have toiled in the dark, confined spaces and constraints in an underground mine, often times working in muck and mire, will appreciate the feature of eliminating these bolts. Bolts typically are lost, dropped, or at least are difficult to thread and bolt up. Moreover, bolts become gunked up in the muck and mire in an underground mine. The gunked-up bolts are difficult to thread or install.

In one aspect, the novel conveyor belt and frame combination provide a low profile continuous haulage system for carrying coal from low coal seams, e.g., such as less than, but not limited to, about 48 inches in vertical height in an underground mine. The low coal seams make it extremely difficult for physical activity in the confining spaces and constraints of the underground mine. Every physical effort is magnified many fold in difficulty level by the confining spaces of the low coal.

The continuous haulage conveyor system of the present invention is made possible by structural conveyor side rails capable also of carrying a continuous haulage mobile bridge. In accordance with the present invention, continuous haulage provides an uninterrupted transportation of material from a mining unit to the mine transportation system by several units of heavy haulage equipment on a track needed for the extensible and retractable haulage equipment, e.g., the mobile bridge units extending from and attached to the continuous mining machine to form the continuous haulage system and associated continuous advancing conveyor system. The wheels of the mobile bridge or other dolly or carriage run on the top side of structural conveyor floor-stand-connecting rail.

In one aspect of the present invention, the conveyor belt itself holds the floor-mounted slider holding structure together in tension. In that mode of operation, the conveyor belt is held taut by jack belt tensioning and the belt tension on the floor-mounted slider holding frame. In one aspect of the present invention, the structural floor-stand connecting side rail is press fit onto the male connecting pin adapted to be affixed to or to be a part of slider holding frame. In that mode of operation, the structural floor-stand-connecting rail is press fit onto the pin, and the structure is held together by belt tension of the endless conveyor belt.

The importance of the structure held together by belt tension of the endless conveyor belt is highlighted by the structural side rails and rail continuity insert capable of carrying a mobile bridge. The wheels of the mobile bridge or other dolly or carriage would run on the top side of rotatable structural rail.

In accordance with the present invention, a Quick-Pull LTD extensible continuous haulage system provide all of the herein described benefits of accommodating heavier equipment as needed in mining operations today together with the much preferred benefits of an efficient and flexible continuous haulage system of our invention for the underground mine.

In the foregoing specification and in the figures of the drawings, a detailed description has been provided and set down and further includes specific embodiments of the present invention for the purpose of illustration. In respect to the figures of the drawings of the specification of the present invention, like items are identified by like numerals. As the invention has been illustrated by the preceding detailed description and in the figures of the drawings, the apparatus and method of the present invention are not intended to be construed as being limited to the specific examples of the preferred embodiments. Variations may be made to include aspects of the complete disclosure as set forth in the figures of the drawings and in the detailed description without departing from the scope of the invention as disclosed in the specification and as defined in the appended claims which follow.

The apparatus and method of the present invention are not intended to be limited to the descriptions of specific embodiments herein above, but rather the apparatus and method of the present invention should be viewed in terms of the complete specification and claims which follow and equivalents thereof.

What is claimed is:

1. A conveyor apparatus, comprising:
   a continuous conveyor belt for carrying coal or ore discharged from a continuous miner;
   a top slider insert for supporting the coal-carrying or ore-carrying continuous conveyor belt;
   a plurality of floor-supported bottom stands 26 for holding the top slider insert and having two (2) vertical/horizontal alignment pins 30, a tubular cross member 29 for supporting a bottom belt, a return belt slider 35, a plurality of floor support skid plate assemblies 34, a plurality of locking plate assemblies 33 constructed from two locking receiver plates 40, and a gusset 44 for reinforcing the floor supported bottom stand 26 and floor support skid plate assembly 34; and
   a truss-reinforced side rail assembly 22 having clearance truss bar 52 double bent to strengthen a side rail 51 and further having a connecting plate 50 for increasing the yield of the side rail 51 and forming a solid linkage to the locking plate assembly 33 and further having a reinforced shim plate 54 for reinforcing a locking pin hole 53 and connecting plate 50 and vertically stabilizing the truss reinforced side rail assembly 22;
   wherein said conveyor apparatus is capable of being held in position by belt tension and further is capable of being held in position optionally by locking pins 32 and further is capable of rapid and efficient extendable, retractable construction in the mine, and wherein the continuous haulage system further is capable of handling larger and heavier pieces of equipment and wherein the continuous haulage system further is capable of being pulled to a different position in an underground mine as a complete unit.

2. A conveyor apparatus as set forth in claim 1, wherein the side rails 51 connect and hold adjacent floor-supported bottom stands 26 in position by press-fit attachment of the rails to the bottom stands, but also wherein the conveyor apparatus is capable of being pulled to a different position in an underground mine as a complete unit.

3. A conveyor apparatus as set forth in claim 1, wherein each and every component is capable of being lifted, carried, installed, and disassembled manually, by hand.

4. A conveyor apparatus as set forth in claim 1, comprising a flexible extensible continuous haulage conveyor.

5. A conveyor apparatus as set forth in claim 1, comprising a flexible extensible continuous haulage conveyor locked together rigidly.

6. A conveyor apparatus as set forth in claim 1, comprising a flexible extensible continuous haulage conveyor locked together rigidly and adapted to advance the complete conveyor structure as a complete unit.

7. A conveyor apparatus as set forth in claim 1, comprising a flexible extensible continuous haulage conveyor locked together rigidly and adapted to advance the complete conveyor structure as a complete unit and further having an enhanced structure adapted to handle heavier equipment.

8. A conveyor apparatus as set forth in claim 1, wherein said rails 51 comprise tubular trussed rails providing track for wheels for a dolly or carriage run.

9. A conveyor apparatus as set forth in claim 1, wherein said rails 51 comprise interlocking tubular trussed rails.

10. A conveyor apparatus as set forth in claim 1, wherein the floor support skid plate assemblies 34 comprise a skid plate 42 having a double flange bent with a symmetrical slope on each end of said skid plate 42 to enable the conveyor structure to be pulled or pushed with limited resistance.

11. A conveyor apparatus as set forth in claim 1, having four points of contact formed by the side rail assemblies 22 and the bottom stand assemblies 26.

12. A conveyor apparatus as set forth in claim 1 for mining low vertical seam height coal.

13. A conveyor apparatus as set forth in claim 1 for mining low vertical seam height coal, less than standing room.

14. A method of continuous haulage in a mine, comprising:
carrying coal or ore discharged from a continuous miner on a continuous conveyor belt;
supporting the coal-carrying or ore-carrying continuous conveyor belt on a top slider insert;
holding the top slider insert by a plurality of floor-supported bottom stands 26 having two (2) vertical/horizontal alignment pins 30, a tubular cross member 29 supporting a bottom belt, a return belt slider 35, a plurality of floor support skid plate assemblies 34, a plurality of locking plate assemblies 33 constructed from two locking receiver plates 40, and a gusset 44 reinforcing the floor supported bottom stand 26 and floor support skid plate assemblies 34; and
providing a truss-reinforced side rail assembly 22 having clearance truss bar 52 double bent strengthening a side rail 51 and further having a connecting plate 50 increasing the yield of the side rail 51 and forming a solid linkage to the locking plate assembly 33 and further having a reinforced shim plate 54 reinforcing a locking pin hole 53 and connecting plate 50 and vertically stabilizing the truss reinforced side rail assembly 22;
holding said conveyor apparatus in position by belt tension and further holding said conveyor apparatus in position optionally by a locking pin 32; and pulling said conveyor apparatus to a different position in an underground mine as a complete unit.

15. A method of continuous haulage in a mine as set forth in claim 14, further comprising connecting and holding adjacent bottom stands 26 in position by press-fit attachment of the rails 51 to the bottom stands 26, but also pulling said conveyor belt and bottom stands to a different position in an underground mine as a complete unit.

16. A method of continuous haulage in a mine as set forth in claim 14, further comprising lifting, carrying, installing, and disassembling each and every component manually, by hand.

17. A method of continuous haulage in a mine as set forth in claim 14, comprising locking together and advancing the complete conveyor structure as a complete unit.

18. A method of continuous haulage in a mine as set forth in claim 14, comprising advancing the complete conveyor structure as a complete unit.

19. A method of continuous haulage in a mine as set forth in claim 18, further comprising providing interlocking tubular trussed rails.

20. A conveyor apparatus, comprising:
a continuous conveyor belt for carrying coal or ore discharged from a continuous miner;
a top slider insert for supporting the coal-carrying or ore-carrying continuous conveyor belt;
a plurality of floor-supported bottom stands 26 for holding the top slider insert and having two (2) vertical/horizontal alignment pins 30, a tubular cross member 29 for supporting a bottom belt, a return belt slider 35, a plurality of floor support skid plate assemblies 34 having a double flange skid plate 42 bent with a symmetrical slope on each end of said skid plate 42 to enable the conveyor structure to be pulled or pushed with limited resistance, a plurality of locking plate assemblies 33 constructed from two locking receiver plates 40, and a gusset 44 for reinforcing the floor supported bottom stand 26 and floor support skid plate assembly 34; and
a truss-reinforced side rail assembly 22 having tubular trussed side rails 51 providing track for wheels for a dolly or carriage run and connecting and holding adjacent floor-supported bottom stands in position by press-fit attachment of the rails to the bottom stands, said truss-reinforced side rail assembly 22 further having clearance truss bar 52 double bent to strengthen a side rail 51 and further having a connecting plate 50 for increasing the yield of the side rail 51 and forming a solid linkage to the locking plate assembly 33 and further having a reinforced shim plate 54 for reinforcing a locking pin hole 53 and connecting plate 50 and vertically stabilizing the truss reinforced side rail assembly 22;
wherein said conveyor apparatus is capable of being held in position by belt tension and further is capable of being held in position optionally by locking pins 32 and further is capable of rapid and efficient extendable, retractable construction in the mine, and wherein the continuous haulage system further is capable of handling larger and heavier pieces of equipment and wherein the continuous haulage system further is capable of being pulled to a different position in an underground mine as a complete unit.

\* \* \* \* \*